United States Patent [19]

Thomas

[11] Patent Number: 5,765,792
[45] Date of Patent: Jun. 16, 1998

[54] APPARATUS FOR HOLDING HAND HELD HAIR DRYER TO DRY PAINT SAMPLE

[76] Inventor: James R. Thomas, 2 Freshmeadow Dr., Lancaster, Pa. 17603

[21] Appl. No.: 746,670

[22] Filed: Nov. 14, 1996

Related U.S. Application Data

[63] Continuation-in-part of Ser. No. 379,299, Jan. 27, 1995, abandoned.

[51] Int. Cl.⁶ ........................................... F16L 3/00
[52] U.S. Cl. .................. 248/121; 248/175; 248/176.2
[58] Field of Search ...................... 248/121, 146, 248/175, 176.2, 117.4, 117.5, 105, 106; 219/242; 292/384

[56] References Cited

U.S. PATENT DOCUMENTS

| | | | |
|---|---|---|---|
| D. 90,974 | 11/1933 | Decker | D28/18 |
| D. 103,978 | 4/1937 | Pitner | D28/18 X |
| 2,211,227 | 8/1940 | Feindel | 248/106 |
| 2,349,054 | 5/1944 | Phipps | 248/106 |
| 4,278,223 | 7/1981 | Fauteux | 248/125.8 |
| 5,064,154 | 11/1991 | Payne | 248/121 |

*Primary Examiner*—Ramon O. Ramirez
*Attorney, Agent, or Firm*—James Ray & Associates

[57] ABSTRACT

Apparatus adapted to hold a conventional hair dryer for the purpose of quickly drying a paint sample which includes a base member adapted to rest upon a horizontal surface, an upright support member extending from the base member, and a dryer retaining member having an aperture therethrough, disposed on the upright support member and spaced from the base member. The aperture is adapted to have a blower tube of a hair drier inserted downwardly therethrough, such that the body portion of the hair dryer will be retained against an upper surface of the dryer retaining member with the blower tube oriented generally downwardly through said aperture.

4 Claims, 5 Drawing Sheets

APPARATUS FOR HOLDING HAND HELD HAIR DRYER TO DRY PAINT SAMPLE

BACKGROUND OF RELATED APPLICATIONS

This application is a Continuation-In-Part of patent application Ser. No. 08/379,299, filed Jan. 27, 1995, now abandoned.

FIELD OF THE INVENTION

This invention relates generally to the preparation of dried paint samples and to an apparatus for more quickly preparing paint samples and, more particularly, this invention relates to a unique and novel stand apparatus for mounting a conventional, hand held, hair dryer for purposes of drying one or more paint sample more easily and more quickly.

BACKGROUND OF THE INVENTION

It is generally well known that the color, shading and/or gloss of any given paint will normally change somewhat after it has been applied to a substrate and allowed to dry. Normally, most paint retailers will maintain a number of paint samples in the form of small cards and/or boards of the standard paint colors that they maintain in stock so that a customer can see in advance the exact color, shading and/or gloss of the stock paint when applied and dried.

With regard to custom mixed paint, however, one cannot know for sure what the mixed paint is going to look like when applied and dried without first obtaining a sample having the paint applied and dried thereon. While it takes little effort to paint or apply a small sample of the custom mixed paint onto a board or card, a primary problem often lies in a rather long period of time waiting for the paint sample to dry.

If after such a wait, the resulting paint sample appearance was not what was intended, it will be necessary to make some adjustments in the paint additives, and again paint or apply another sample to a board or card, and again await the prolonged drying time. At times, this procedure may be repeated several times until the appearance of the dried paint is exactly what the customer wants. With each such adjustment made to the paint composition, of course, a sample will have to be prepared, dried and examined, with the usual waiting time to allow the paint sample to dry.

SUMMARY OF THE INVENTION

This invention is predicated on my conception and development of a unique and novel apparatus to more quickly dry a paint sample for the purpose of reducing the time one must wait for the paint sample to dry. The apparatus itself is a rather low cost stand structure adopted to hold and retain a conventional hand held hair dryer, while the hair dryer is turned-on and directed towards the paint sample. The hot air blast from the hair dryer directed directly onto the freshly painted sample, will very significantly accelerate the drying time, which benefits not only the paint retailer but also the customer waiting to examine the dried paint sample. Experience with this apparatus, using a 1500 watt hair dryer, set at maximum heat and maximum fan speed settings, has been shown to reduce a normal one hour waiting period to no more than about 10 minutes. Hand held hair dryers for use with the apparatus of this invention are well know, and normally comprise a body portion housing a small electric motor for rotating a blower fan, a handle for one-handed holding of the hair dryer, and a blower tube extending from the body portion from which the hot air emerges.

In essence, the inventive apparatus of this invention comprises a base member adapted to rest upon a horizontal surface such as a table or bench-top, a dryer retaining member, and an elongated spacing member having one end rigidly attached to the base member and the other end incorporating the dryer retaining member. The dryer retaining member has an aperture designed to receive the blower tube of the hair dryer such that the body portion of the hair dryer can be retained against an upper surface of the dryer retaining member with the blower tube oriented generally downwardly through the aperture, with the heated air blown therefrom directed downwardly. The elongated spacing member has a fixed, predetermined length to space the blower tube above the horizontal surface by a fixed, predetermined distance. The apparatus may optionally include a holding means, such as a clip, to hold the painted flat board or card adjacent to the base member in the path of the hot air emerging from the blower tube of the hair dryer. Depending upon the size and nature of the aperture through the dryer retaining member, a bracing support means extending from the dryer retaining member may also be included, which is adapted to brace against the outer portion of the blower tube of the hair dryer to maintain the blower tube pointed in a generally angled, downward direction, preferably at an angle of about 45 degrees. Normally, however, such a bracing support means can be included into, and as a part of, the dryer retaining member. In order to receive and retain most conventional hand held hair dryers, the aperture, which can be circular or rectangular, should be adapted to receive a blower tube having a diameter of about 2.5 inches. For simplicity of construction, the entire apparatus can be fabricated of metal rods, preferably steel rods having a diameter of at least about one-quarter inch.

OBJECTS OF THE INVENTION

Accordingly, it is a primary object of the present invention to provide an apparatus useful in the preparation of dried paint samples.

It is another primary object of the present invention to provide an apparatus useful in speeding the preparation of dried paint samples.

Another primary object of the present invention is it to provide an apparatus useful in combination with a conventional, hand held hair dryer to more quickly dry a paint sample.

Still another primary object of the present invention is it to provide an apparatus adapted to receive and retain a conventional, hand held hair dryer in a spaced relationship from a paint sample and maintain that relationship while emerging hot air from the hair dryer quickly dries the paint sample.

An even further object of the present invention is to provide an apparatus as above-described which includes a means for securely retaining the paint sample in the path of hot air emerging from the hair dryer.

These and other objects and advantages will become more readily apparent from a full understanding of the following detailed description of the invention, particularly, when such description is considered in view of the attached drawing figures.

3

Figure 1:
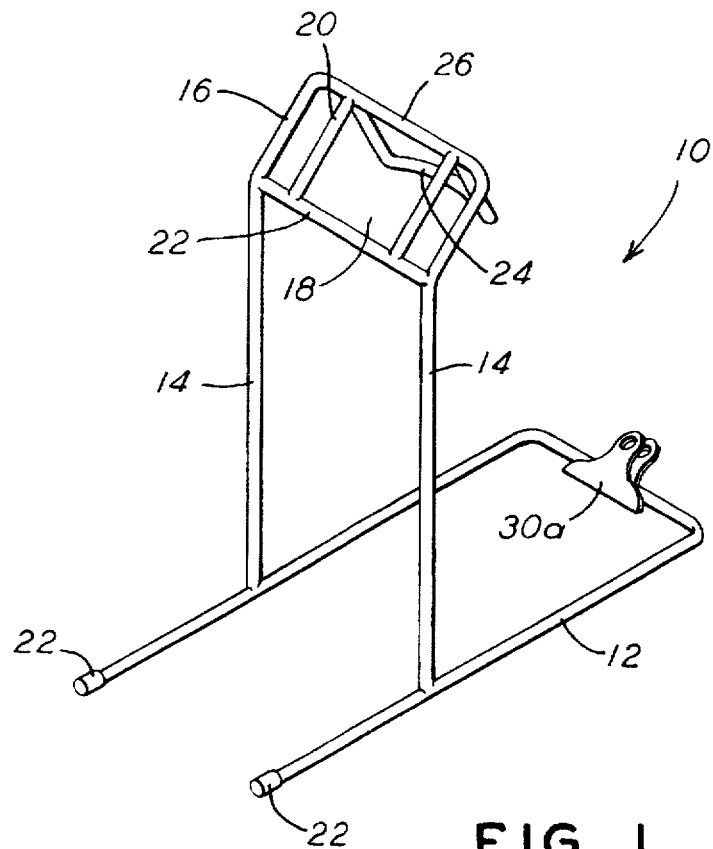
FIG. 1 is an isometric view of one embodiment of the apparatus constructed according to this invention.
Figure 7:
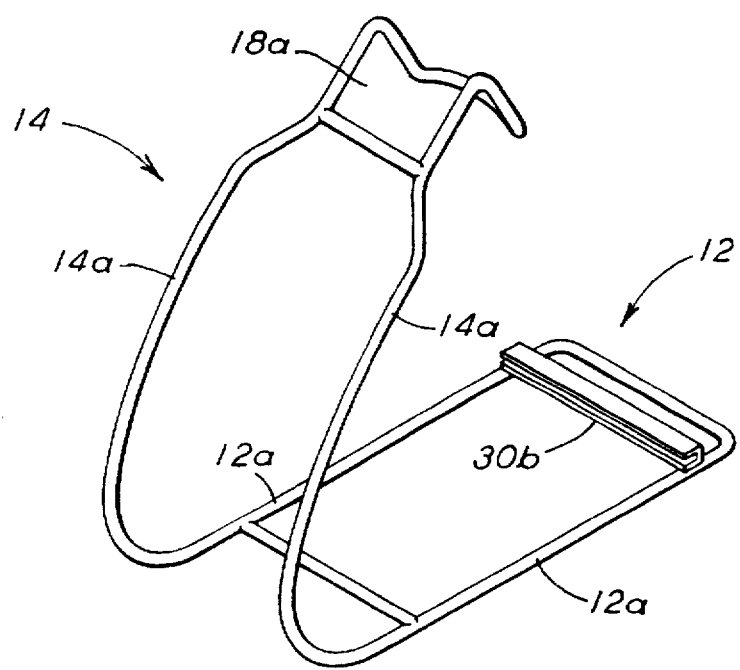
Figure 2:
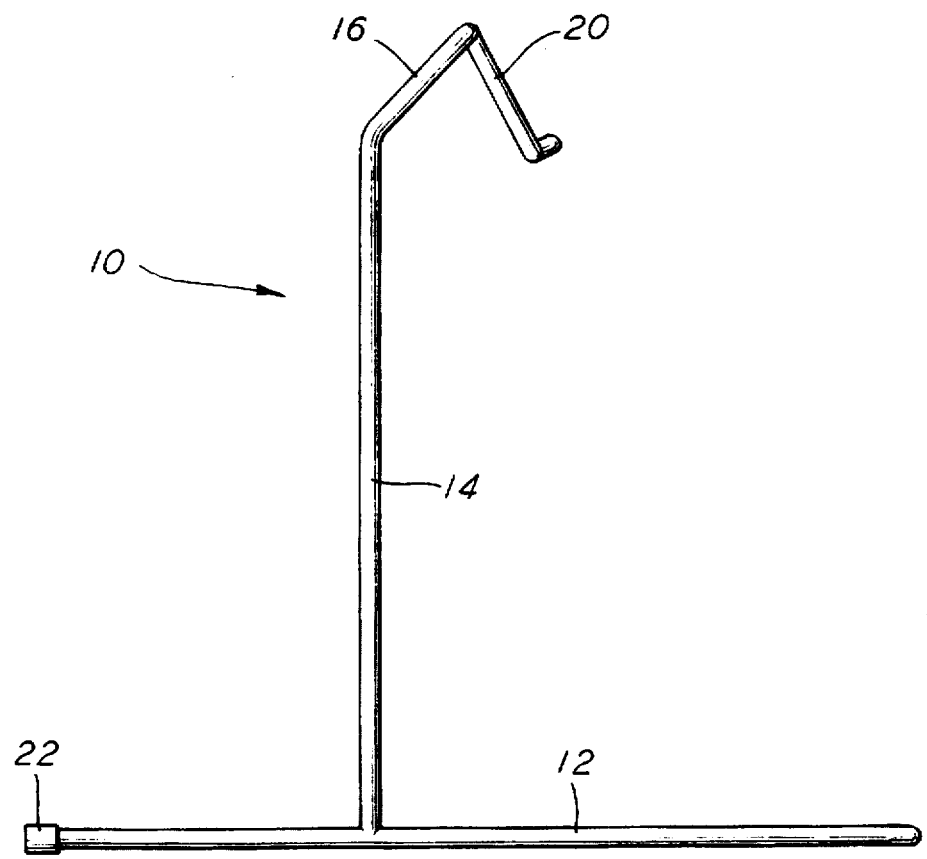
FIG. 2 an elevational side view of the apparatus shown in FIG. 1.
Figure 4:
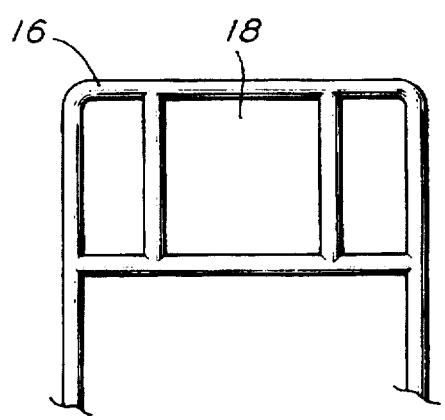
Figure 3:
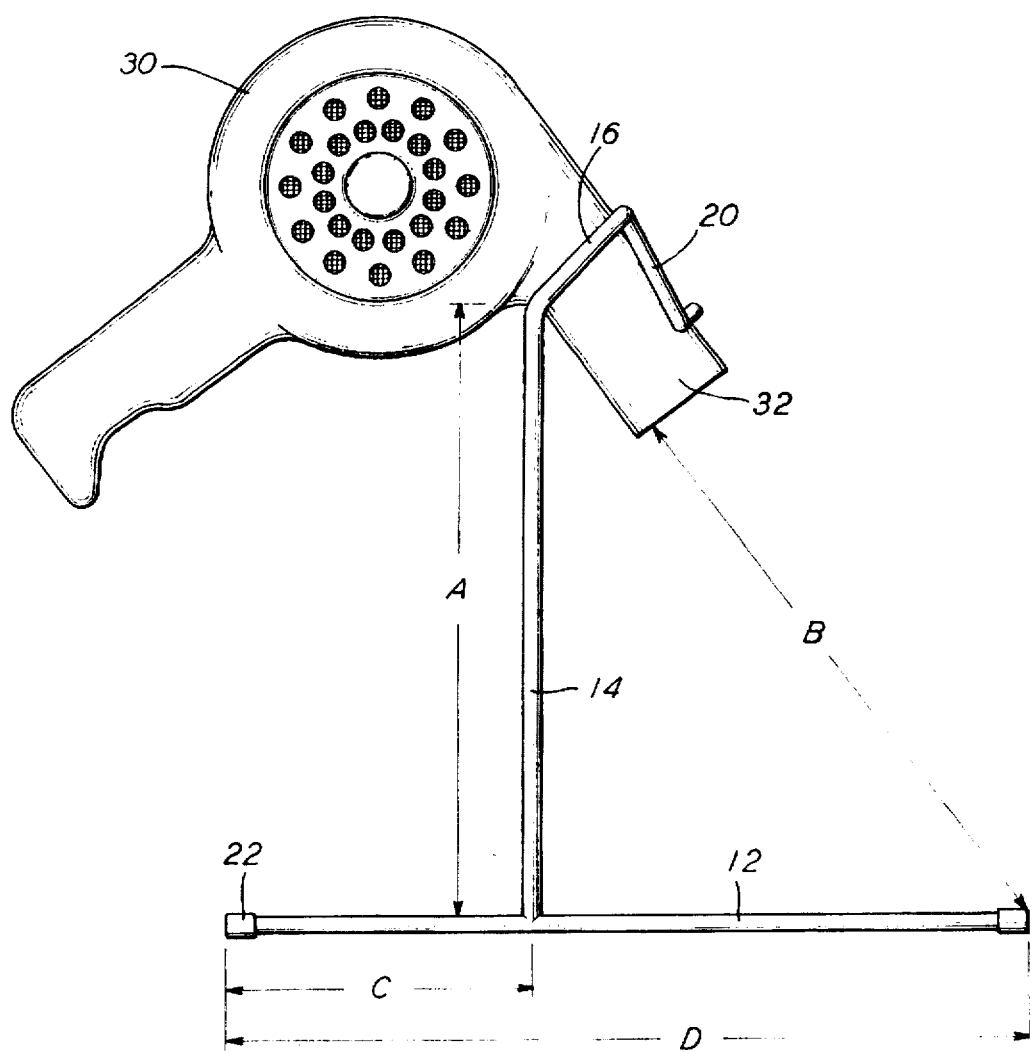
Figure 5:
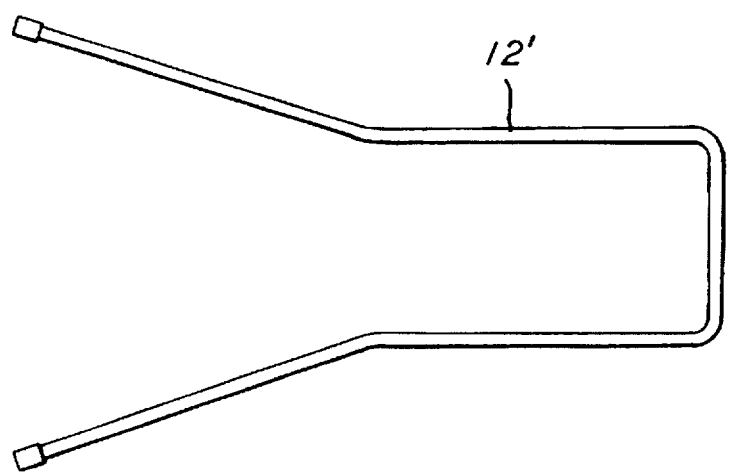
Figure 6:
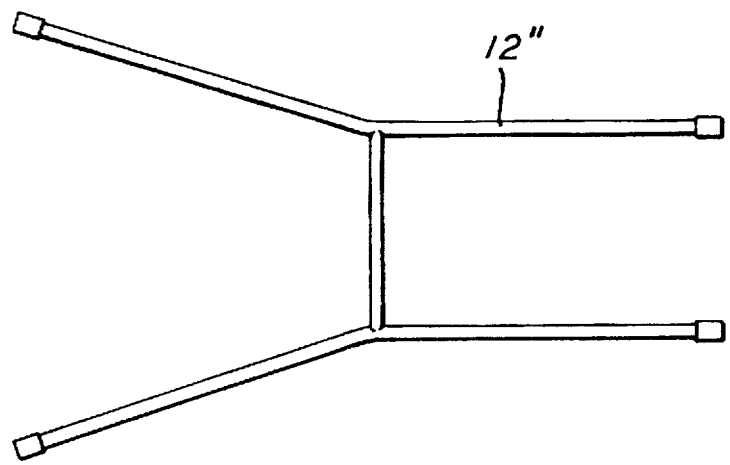
Figure 8:
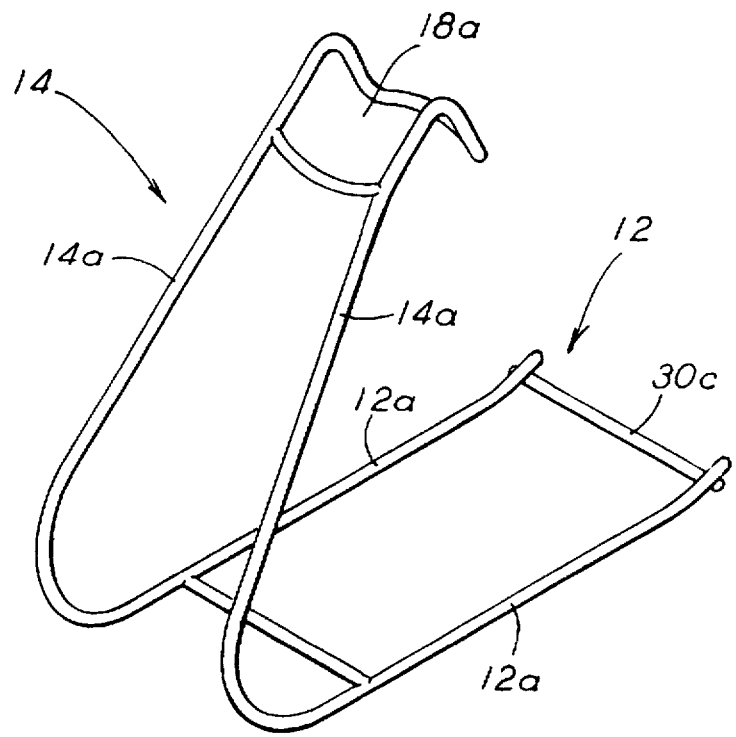
Figure 9:
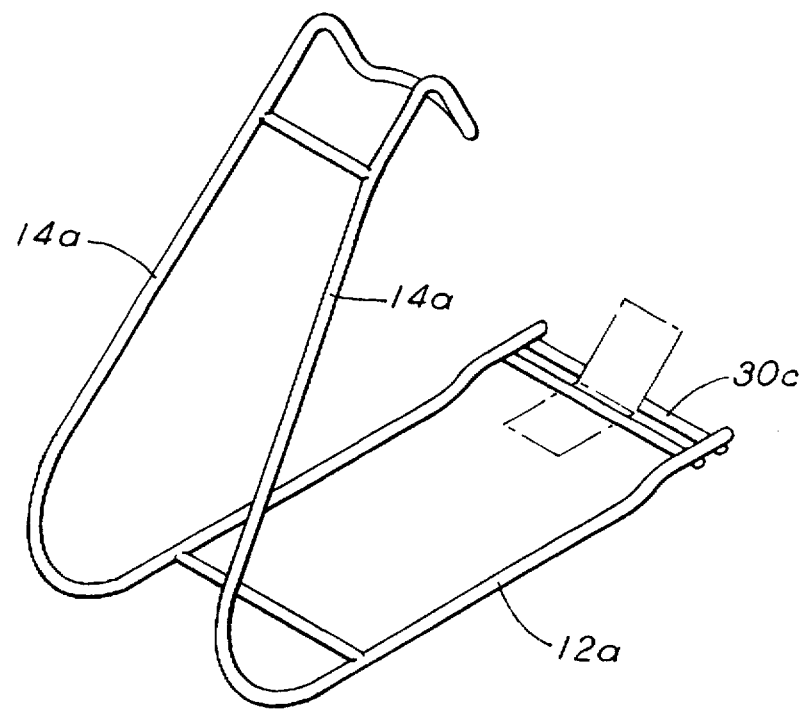

FIG. 3 is identical to FIG. 2 except that it illustrates a hair dryer properly mounted on the apparatus;

FIG. 4 is a plan view of a bracing support means portion of the apparatus shown in FIGS. 1;

FIGS. 5 and 6 are plan views of alternative embodiments of the base support means;

FIG. 7 is an isometric view of a more preferred embodiment of this invention incorporating a means for retaining the paint sample adjacent to the base support means;

FIG. 8 is an isometric view of another more preferred embodiment of this invention incorporating a different means for retaining the paint sample adjacent to the base support means; and FIG. 9 is another isometric view of another more preferred embodiment of this invention similar to that shown in FIG. 8, but utilizing two rods members instead of one between which the paint sample can be retained extending upwardly at an angle to the horizontal support surface.

DESCRIPTION OF THE PREFERRED
EMBODIMENTS OF THE INVENTION

Reference to the FIG. 1 will illustrate a particular embodiment of the apparatus of this invention, namely, an apparatus generally designated 10, adapted to hold a conventional hair dryer for the purpose of quickly drying a paint sample. As shown, the apparatus 10 comprises a base member 12 adapted to rest upon a horizontal surface such as a table or work bench, an upright spacing member 14 extending from the base member 12 such that the upright spacing member 14 will generally extend upwardly from the base member 12 when the base member 12 is resting on a horizontal surface. A dryer retaining member 16, having an aperture 18 therethrough, is disposed on the uppermost end of such spacing member 14, and spaced by a predetermined distance from the base member 12.

In the embodiment shown in FIGS. 1–4, spacing member 14 extends laterally at an angle from the upright spacing member 14, preferably such angle being about 45 degrees. Finally, a bracing support member 20 is secured to the outer end of the retaining member 16 extending generally at a right angle thereto.

The aperture 18 is adapted to have a blower tube 32 of a hair drier 30, inserted therethrough (FIG. 3), and bracing support means 20, extending from such retaining member 16 is adapted to brace against the blower tube 32 of such hair dryer 30 to maintain the blower tube 32 pointed in a generally angled, downward direction, as shown in FIG. 3.

Although the dimensions of the apparatus 10 are not particularly critical, it has been found for best results that the height of the upright support member 14, namely dimension "A" with reference to FIG. 3, is preferably about 11 inches, and that the spacing from the end of the blower tube 32 to the paint sample to be dried, namely dimension "B" is preferably about 8 inches. For a minimum support, the overall length of support base 12, namely dimension "D" should be at least about 10 inches, with at least 5 inches extending on either side of upright support member 14; i.e. dimension "C".

For the purposes of enhancing support, the dimensions of support base 12 can be increased, or other geometric configurations can be utilized, two examples of which are best seen in FIGS. 5 and 6. The most critical dimension is that of aperture 18, which should be sized to accept a blower tube 32 of a hair dryer 30 as will be used with the apparatus 10. Since it has been found that most hair dryers used in this application have blower tubes 32 of about 2.5 inches and less, the aperture 18 as utilized has been sized to receive such a 2.5 inch blower tube 32.

Specifically, aperture 18, as utilized in the embodiment shown in FIGS. 1–4, has been formed by four metal rods in a square configuration, with a 2.5 inch square opening for opening 18. In any event, however, aperture 18 should be big enough to receive the blower tube 32 that will be utilized therewith, without being so loose that it will not properly retain the hair dryer 30 in place.

Reference to FIGS. 7 and 8 will illustrate two presently more preferred embodiments of this invention, wherein the spacing members 14 are not vertically upright, but rather extend upwardly at an angle from base support 12, and differ further in that the aperture through which the dryer blower tube is to be inserted, and the bracing support 20 are combined to in essence form a single aperture 18a.

In contrast to the embodiment shown in FIGS. 1–6, the embodiments of FIGS. 7 and 8 are easier to fabricate, to the extent that the base member 12, the spacing member 14 and even the major portion of aperture 18a can be fabricated from a single length of steel rod. As shown in both FIGS. 7 and 8, the base member 12 is formed by a pair or parallel rod member portions 12a, with spacing member 14 being formed by merely bending upwardly a mid-length portion of the rod, namely a pair of diagonally extending rod portions 14a, so that a hair dryer attached thereto will be reasonably centered over the base member 12 to assure stability of the combined structure.

Obviously, the angle, spacing member 14 and rod portions 14a make with the base member 12 is not critical, as long as the combined structure, with the hair drier attached thereto, is stable, and as long as the blower tube of the hair dryer will be suitable spaced from base member 12, the horizontal surface upon which it rests, or wherever one wished to place the paint sample to be dried.

It should become apparent from a further examination of the embodiment shown in FIGS. 1–4, that the aperture 18 and the bracing support 20 need not, in fact, be two separate elements as shown, but can be combined as a single aperture 18a (as shown in FIGS. 7 and 8) through which the blower tube 32 (FIG. 3) can be inserted, having an upper surface adapted to support the body portion of the hair dryer, with the aperture 18a securing the blower tube 32 in a downwardly pointed direction.

In fact, an aperture as such is not essential as long as there is a first lateral support means 22 which will engage the blower tube near the body portion of the hair dryer, and a second lateral support means 24, spaced from the first, which will engage the opposite side of the blower tube to properly position the blower tube in a stable, downwardly pointed direction. With reference to FIG. 2, such first and second lateral support means 22 and 24 respectively are shown. Clearly, element 26, shown in FIG. 2, which closes aperture 18, is not essential, apart from the fact that it forms the base from which lateral support 24 is indirectly suspended.

As best shown in the embodiments of FIGS. 7 and 8, the aperture 18a does include the first lateral support 22 and the second lateral support 24, which are in essence formed by opposing portions of aperture 18a As used herein, therefore, an "aperture" is intended to mean an opening, such as aperture 18a, whether open or closed, through which a blower tube 32 can be inserted.

While not an essential element, the apparatus of this invention may optionally include a holding means 30 adapted to hold a flat sheet of cardboard or the like upon which the paint sample has been applied, to keep it in place in the path of the hot air blown from the blower tube 32 of the hair dryer 30. As shown in FIG. 1, such a holding means can simply comprise a simple spring clip 30a attached to base member 12.

As shown in FIG. 7, the holding means can comprise a simple two sided holding means 30b having a slot therein into which the sample sheet of cardboard or the like can be inserted. A presently preferred embodiment is shown in FIG. 8 where in the holding means merely comprises an elongated rod 30c, which can be a part of base member 12, which is adapted to abut against the horizontal surface supporting the apparatus 10 under which the sheet of cardboard or the like can be placed. Such a holding means may be advisable if the paint sample is applied to a relatively small sheet of cardboard or the like which could be blown away from a good drying position by the blast of hot air emerging from the blower tube 32 of the hair dryer 30.

While the apparatus 10 can be fabricated from practically any structural material, for simplicity of fabrication, the use of straight metal rod, specifically one-quarter-inch steel rod has been chosen for all structural elements for the embodiments illustrated in the figures. By using such metal rod as a structural material, fabrication can be rather simple, in that base member 12 can merely comprise a "U" shaped form as has been shown in FIGS. 1 and 7, while upright spacing member 14 can merely comprise a pair of straight, parallel rods secured at an angle to base member 12, also as shown in FIG. 1, or the entire structure can be formed from a single length of rod as shown in FIG. 7.

In a like manner, retaining member 16 is easily fabricated of metal rod formed in a rectangular configuration as is shown in FIG. 1, with aperture 18 having a rectangular or square configuration simply formed by four metal rods, again as shown in FIG. 1. While of course, aperture 18 can have a circular configuration if desired, a square configuration as shown will be adequate to retain a circular blower tube 32, and will be easier to fabricate. As also shown in FIG. 1, bracing support means 20 can be fabricated of metal rod forming three sides of a rectangular configuration, with the ends thereof joined to the extreme outer portion of retaining member 16. As shown, the mid-portion of bracing support member 20 has a curved configuration. While this configuration is not essential, it does serve to better engage and brace against a cylindrical side surface of blower tube 32 to minimize any possible pivotal movement of the blower tube 32 while the combined unit is in operation. As shown in FIG. 8, lateral supports 22 and 24 can also be provide with a curved configuration to better hold the blower tube in a properly aligned position.

Preferably, non-skid, protective rubber caps 22 should be placed on any exposed end of a metal rod, as shown in each of the FIGS. 1–3 and 5–6.

While it was noted above that dryer retaining member 16 is disposed on upright support member 14 at an angle of preferable 45 degrees to base member 12, this angle is not critical, and was chosen for the purpose of assuring that the hair dryer 30 cannot fall from the apparatus 10, and orienting aperture 18 in a plane at a preferred angle of about 45 degrees to a horizontal surface upon which the paint sample will be placed.

Having described above a preferred embodiment of this invention, a number of other embodiments and modifications should become readily apparent. For example, it can readily be seen that the apparatus could be fabricated from material other than metal rod; i.e., the apparatus could be injection molded of plastic pieces, provided that plastic material was one that could withstand the heat of the blower tub 32 without deforming. In addition, it should be noted that the method for joining the various metal rods was not described. While welding has been the preferred technique, it should be apparent that other techniques could be utilized such as the use of joining tubes which would add the ability to breakdown the apparatus to make it more portable. Clearly, other modifications could be made and incorporated without departing from the spirit of the invention.

I claim:

1. An apparatus to hold and position a conventional, normally hand held, hair dryer of the type having a blower tube extending from a body portion through which heated air is blown outwardly, for the purpose of quickly drying a paint sample, said apparatus comprising: a base member adapted to rest upon a horizontal surface, a dryer retaining member, and an elongated spacing member having a first end rigidly attached to said base member and a second end to which said dryer retaining member is incorporated; said spacing member having a predetermined length adapted to space said dryer retaining member by a predetermined distance from said base member; said dryer retaining member having an aperture adapted to receive such blower tube of such hair dryer such that such body portion of such hair dryer can be retained against an upper surface of said dryer retaining member with such blower tube oriented generally downwardly through said aperture, with the heated air blown therefrom directed downwardly towards such horizontal surface supporting said base member; and said base member being adapted to support a flat body upon which a paint sample has been applied, such that such paint sample is positioned in the path of heated air emerging from such blower tube of such hair dryer; said base member further including means for securing such flat body in place.

2. An apparatus, according to claim 1, in which said means for securing such flat body in place comprises an elongated portion of said base member adapted to abut against such horizontal surface such that such flat body can be secured in place by being positioned between such elongated portion and such horizontal surface.

3. An apparatus, according to claim 1, in which said means for securing such flat body in place comprises an elongated channel member adapted to receive and retain an elongated edge of such flat body.

4. An apparatus, according to claim 1, in which said means for securing such flat body in place comprises a spring biased clip member to which such flat body can be secured.

* * * * *